United States Patent
Reum, Sr.

[11] Patent Number: 5,855,090
[45] Date of Patent: Jan. 5, 1999

[54] LANDSCAPE FABRIC

[75] Inventor: Donald J. Reum, Sr., Bonita Springs, Fla.

[73] Assignee: Avon Plastics, Inc., Albany, Minn.

[21] Appl. No.: 861,617

[22] Filed: May 22, 1997

[51] Int. Cl.⁶ .................................................. A01G 7/00
[52] U.S. Cl. ................................................. 47/9; 405/258
[58] Field of Search ......................... 47/9, 1.01; 405/17, 405/258

[56] References Cited

U.S. PATENT DOCUMENTS 4,304,069  12/1981  Kobayashi .................................. 47/9

FOREIGN PATENT DOCUMENTS

| 2563690 | 11/1985 | France | 47/9 |
| 3626981 | 2/1988 | Germany | 47/9 |
| 55-30984 | 3/1980 | Japan | 47/9 |
| 518054 | 3/1972 | Switzerland | 47/9 |
| 280419 | 11/1927 | United Kingdom | 47/9 |
| 94019926 | 9/1994 | WIPO | 47/9 |

*Primary Examiner*—Michael J. Carone
*Assistant Examiner*—Joanne C. Downs
*Attorney, Agent, or Firm*—Merchant, Gould, Smith, Edell, Welter & Schmidt, P.A.

[57] ABSTRACT

An improved landscape fabric is disclosed consisting of a sheet of thermoplastic material in which a plurality of alternating hollow ridges and valleys are formed. Each of the ridges is defined by a pair of upright sidewalls and an interconnecting top. A plurality of spaced apertures are formed through each of the upright walls at its juncture with an adjacent valley, being disposed to permit the flow of water and air therethrough to the underside of the sheet while inhibiting the passage of light therethrough. The improved fabric has extensibility and flexibility during installation, permitting it to conform to the area to be covered without having to be fabric itself.

14 Claims, 3 Drawing Sheets

LANDSCAPE FABRIC

BACKGROUND OF THE INVENTION

SUMMARY OF THE INVENTION

The invention is directed to an improved landscape fabric which permits the flow of air and water while resisting the passage of light therethrough.

Landscape fabric is commonly used today in landscaped areas for resisting the growth of weeds and other unwanted plant life. Conventional landscape fabric consists of an opaque film of polyethylene, typically black, having a thickness of 3–6 mils. The film is typically sold in long rolls that are typically 3 feet in width.

After the landscaped bed is prepared with proper soil and drainage, the landscape fabric is unrolled, placed over the bed and cut to any curved configuration of the bed. It is typically staked in place with plastic or steel staples or spikes to prevent movement. Holes are then cut in the fabric at points where plants are desired, and the plants (e.g., trees, bushes and perennials) are then planted through the fabric openings or holes and into the soil. The fabric is then covered by several inches of wood mulch, gravel or rocks, and in the case of crops such as strawberries or tomatoes, tucked into the sides of the plant bed.

Because the landscape fabric is imperforate, water and air are prevented from passing therethrough except through the holes cut as plant openings. Its opaqueness prevents the transmission of light. These water, air and light blocking functions substantially prevent the germination and growing of weeds, which is the primary function of the fabric. However, conventional landscape fabric is not without disadvantages.

First, because it is imperforate other than the plant openings, water and air for the growth of the desired plant life is itself restricted. This can be overcome to some extent by cutting relatively large openings for the plants, but in so doing the germination and growth of weeds is also encouraged in this enlarged area.

Second, conventional landscape fabric is flat and relatively thick, and although flexible to some extent it does not conform well to the irregular contours of the ground. It is possible to cause a tear or hole in the fabric if excessively stressed in a particular area, which can lead to weed growth. However, more importantly, the inability of the landscape fabric to stretch and/or conform to the contours of the ground make it more difficult to install.

The inventive landscape fabric overcomes these problems through its unique design.

Broadly speaking, the landscape fabric is formed (preferably by rotary molding) to include a plurality of ridges each of which has at least one upstanding or substantially vertical wall. In the preferred embodiment, the improved landscape fabric is formed with a plurality of aligned or parallel ridges and alternating valleys, with each ridge consisting of two substantially vertical walls and a rounded top. Small apertures are formed in each vertical wall which permits the flow of both water and air to the underside of the fabric. This flow is enhanced by the formation of a plurality of small transverse channels disposed in the trough or valley between the ridges in alignment with the apertures. Preferably, the transverse channels extend between opposed apertures in adjacent ridges. As water moves through the troughs or valleys between ridges, it falls into the small transverse channels and is led to the apertures, thus flowing through the fabric to ensure that the soil below the fabric is moistened with rain or watering.

However, at the same time, the fact that the apertures are disposed in substantially vertical walls inhibits the passage of light, which cannot travel horizontally in the troughs or valleys to reach the apertures.

The desired plants themselves receive adequate sunlight because they project through and above the landscape fabric. However, weeds and undesired plant life cannot gain a foothold below the fabric because they are unable to receive the necessary sunlight to grow.

The formation of the improved landscape fabric with a significant number of aligned ridges alternating with valleys is also advantageous because it gives the fabric some degree of stretch, thus enabling it to better conform to the contours of the land and any irregularities it may contain. Thus, it is more easily installed than conventional landscape fabric.

The improved landscape fabric is preferably formed from high density polyethylene with a thickness of 5 mils. The combination of the heavy thickness of the film and stiffness of the high density polyethylene results in a landscape fabric that is flexible while having improved strength and the ability to hold its shape in the application. The use of high density polyethylene also is advantageous because it enables formation from recycled plastic. Plastic milk bottles provide a readily available source of high density polyethylene, the reuse of which results in a highly useful product that simplifies installation and provides better long range results in plant growth and weed inhibition.

DETAILED DESCRIPTION OF THE PREFERRED EMBODIMENT

Figure 1:
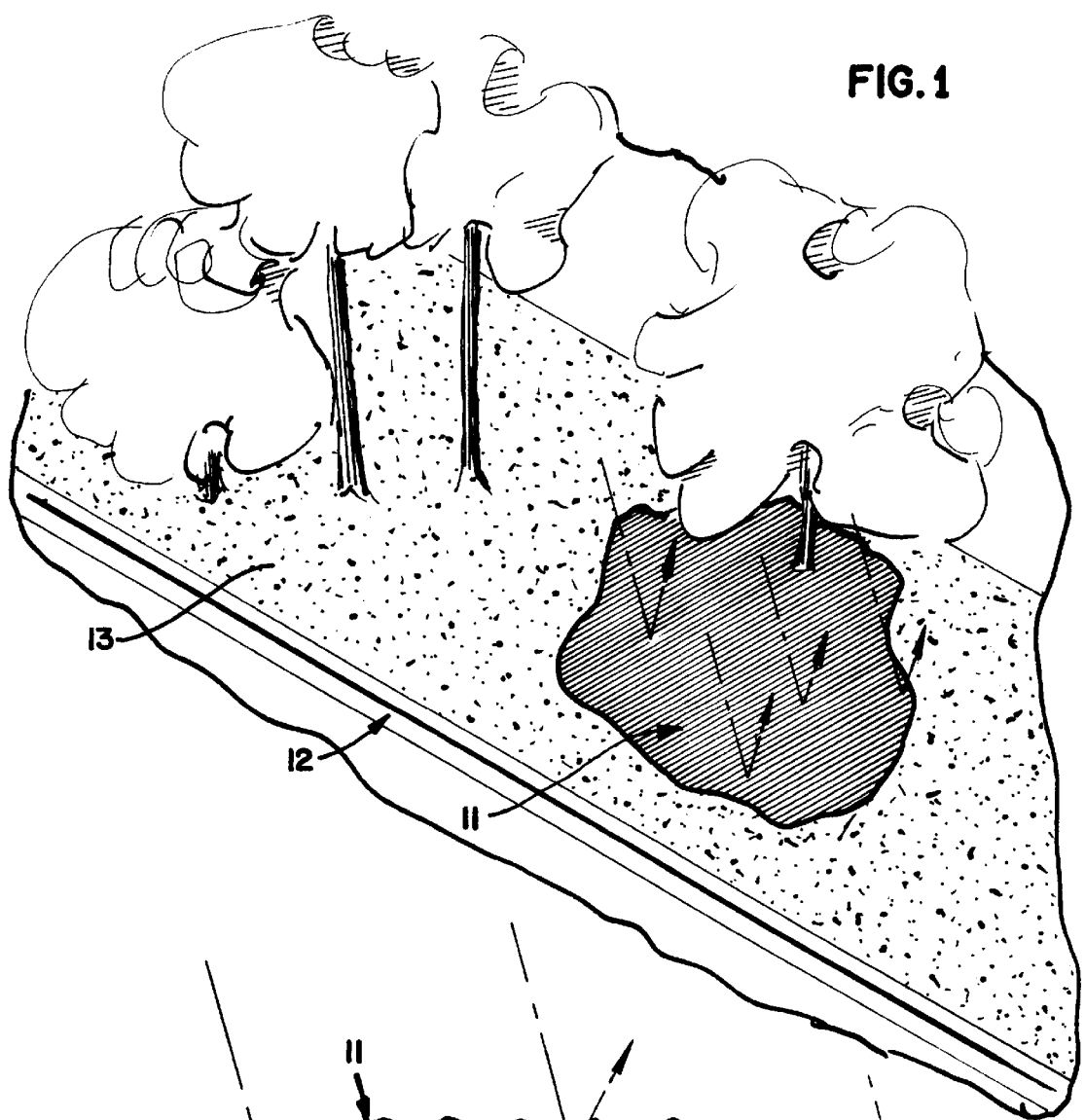
FIG. 1 is a perspective view of a mulch covered landscaped area, a portion of which is broken away to show an improved landscape fabric and its resistance to the passage of light.
Figure 2:
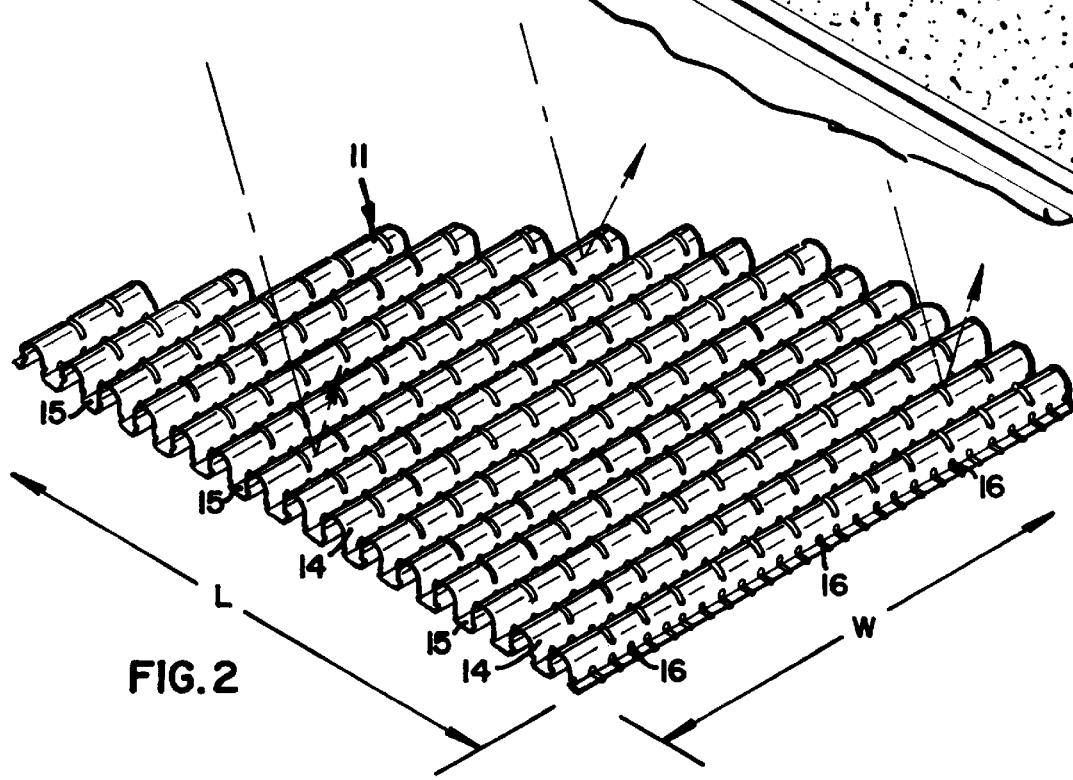
FIG. 2 is an enlarged fragmentary view of the improved landscape fabric showing a plurality of ridges and alternating valleys.

With initial reference to FIG. 1, an improved landscape fabric is represented generally by the numeral 11. This figure depicts a landscaped area bearing the general reference numeral 12 which includes trees and a bush and is covered by mulch 13. The landscape fabric 11 underlies the entirety of mulch 13, although only a fragmentary portion is shown for purposes of clarity.

The specific structure of landscape fabric 11 is shown in FIGS. 2–7. With initial reference to FIG. 2, landscape fabric 11 is preferably formed from recycled high density polyethylene, a source of which is used plastic milk bottles. It is initially formed as a continuous, flat opaque sheet having a thickness of approximately 5 mils. (0.005 inches). While in a heated and pliable state, the polyethylene film has a structural pattern formed in it by rotary molding.

Figure 3:
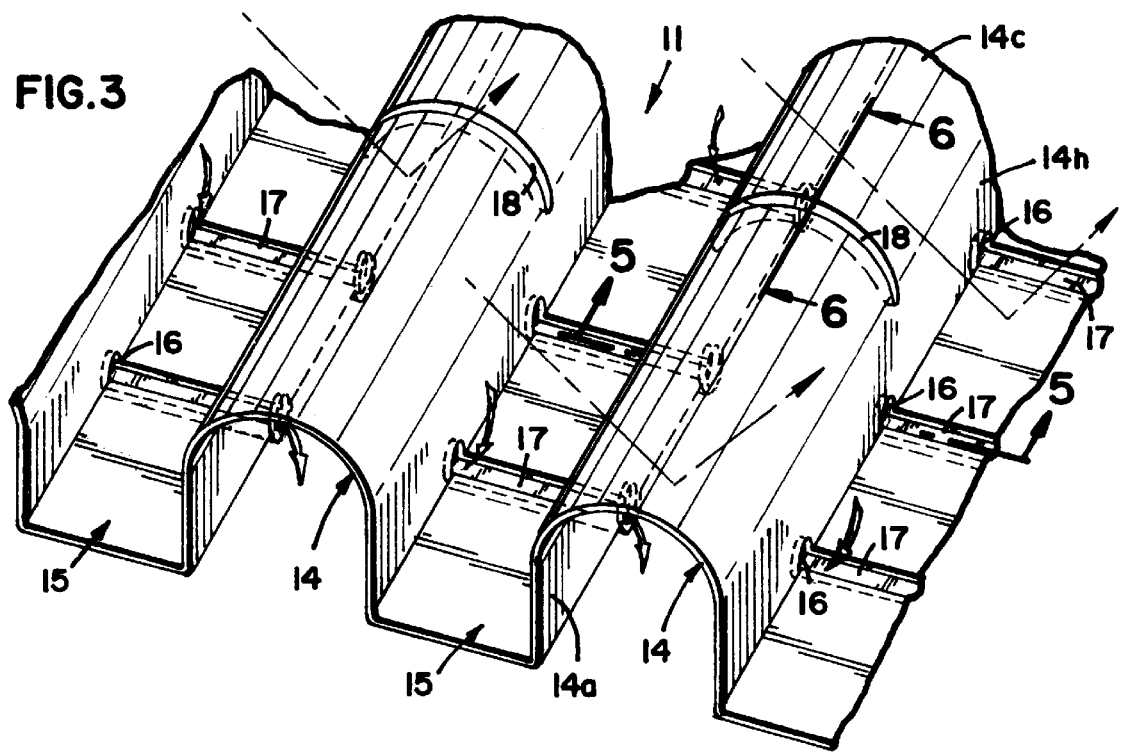
FIG. 3 is a further enlarged fragmentary sectional view of the landscape fabric showing the ridges with apertures for facilitating the flow of water and air.

In the preferred embodiment, the pattern comprises a plurality of hollow longitudinal ridges 14 that are disposed in parallel relation with alternating troughs or valleys 15 disposed therebetween (see also FIG. 3). The spacing of the alternating ridges 14 and valleys 15 is uniform and equidistant in the preferred embodiment.

Figure 5:
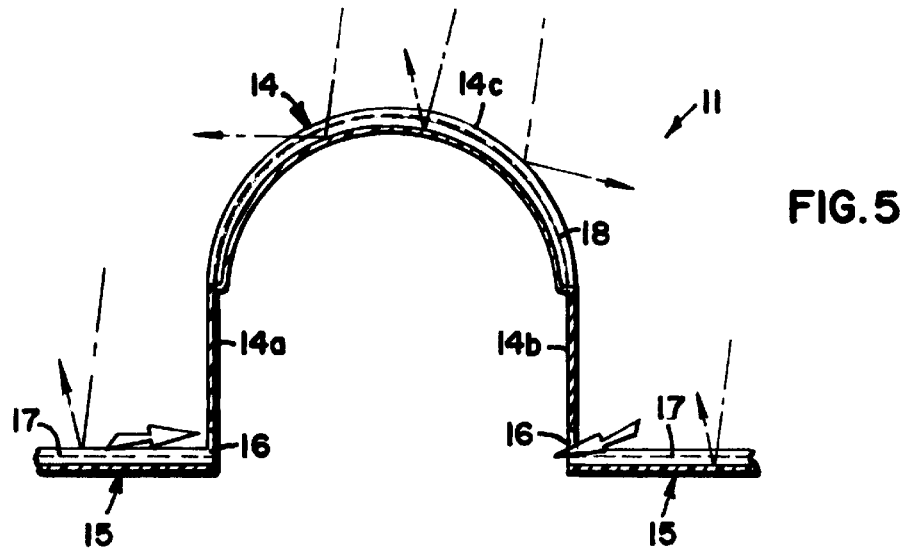
FIG. 5 is a further enlarged fragmentary transverse sectional view taken along the line 5—5 of FIG. 3.
Figure 6:
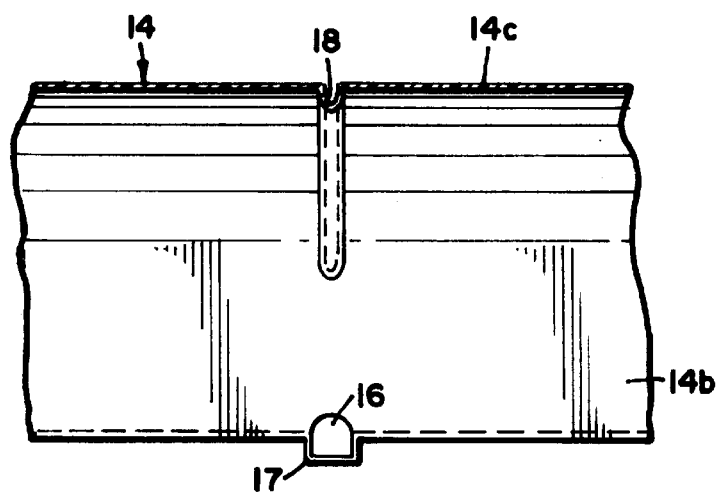
FIG. 6 is a further enlarged fragmentary longitudinal section taken along the line 6—6 of FIG. 3.

With specific reference to FIG. 5, each of the longitudinal ridges 14 is defined by opposed upstanding sidewalls 14a, 14b that are substantially vertical in the preferred embodiment when the landscape fabric 11 rests in a horizontal position. The opposed sidewalls 14a, 14b are interconnected by a rounded dome 14c. The valleys 15 are substantially flat except as described below.

With specific reference to FIGS. 3 and 5, a plurality of apertures 16 are formed in the sidewalls 14a, 14b, preferably at the base junction with the valley 15. The apertures 16 are preferably equidistantly spaced over the length of each sidewall 14a, 14b, defining both longitudinal and transverse rows.

With additional reference to FIGS. 3 and 5, the pattern of landscape fabric 11 is further formed to include a plurality of transversely extending shallow channels 17 that are aligned with and extend between the apertures 16 in adjacent ridges 14. These channels form guideways that encourage the flow of water from the valleys 15 into the apertures 16 and hence to the underside of the landscape fabric 11.

The domed top 14c is also formed with a plurality of longitudinally spaced, transversely extending channels 18 also disposed in alignment with the channels 17 and apertures 16. The channels 18 also encourage water flowing over the top of landscape fabric 11 to move into the valleys 15.

Based on the formation of alternating ridges 14 and valleys 15, landscape fabric 11 has considerable flexibility over its length L (see FIGS. 2 and 7) but retains suitable tensile strength to prevent stretching during installation. The channels 17, 18 enhance flexibility of the landscape fabric 11 over its width W (also as viewed in FIGS. 2 and 7).

Figure 4:
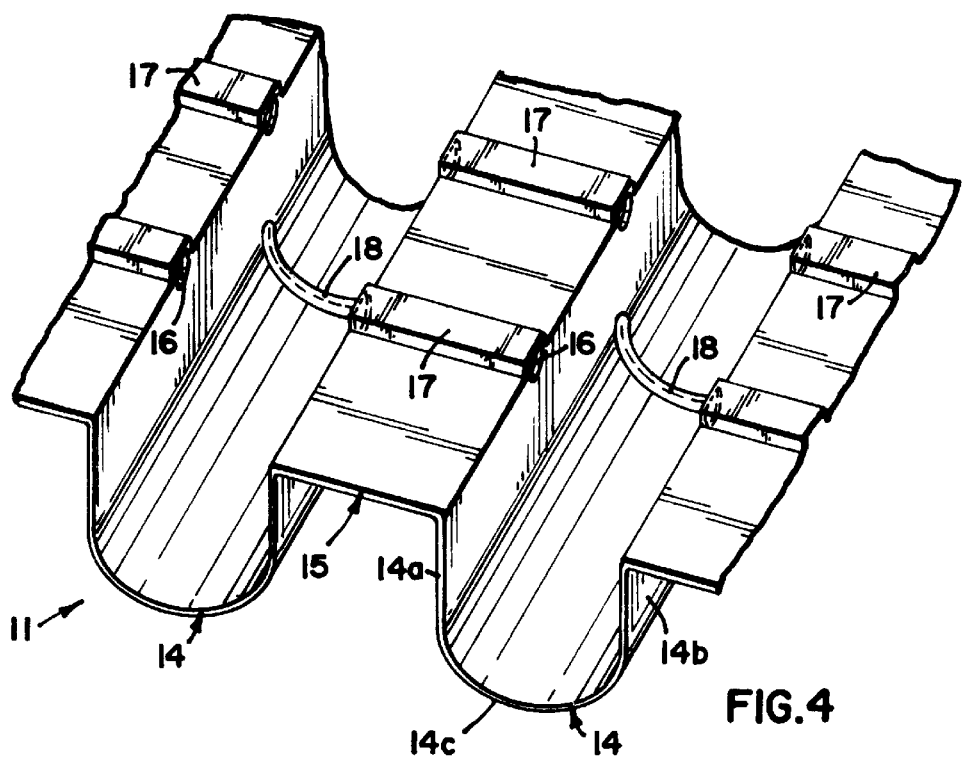
FIG. 4 is a fragmentary perspective view of the improved landscape fabric as viewed from the bottom thereof.

With reference to FIG. 4, which is a bottom perspective view of the landscape fabric 11, the ridges 14 are shown to be hollow; i.e., there is no underlying structure to the walls 14a, b and dome 14c. The underlying flat bottom of the valley 15 is shown, as is the complementing structure of the channels 17, 18.

Figure 7:
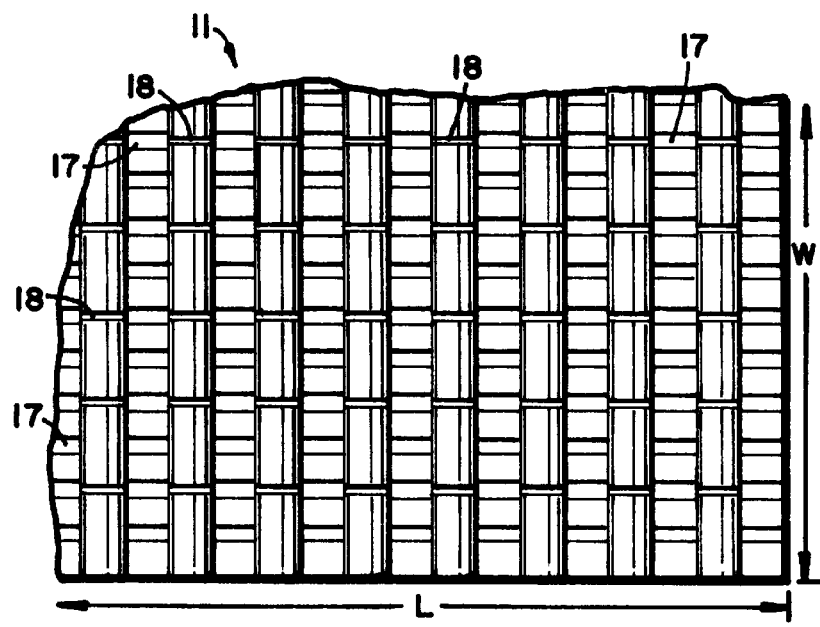
FIG. 7 is a fragmentary top plan of the landscape fabric.

FIG. 7 is a top plan of the landscape structure 11, showing in particular the channels 17, 18 and their spaced, parallel alignment.

In operation, a desired length of the landscape fabric 11 is removed from a roll and laid over the area to be landscaped. If necessary, an additional length or lengths of the landscape fabric 11 may be placed in side-by-side relation with adjacent edges overlapping to obtain the necessary width, and the laid fabric can then be staked for better retention with plastic or metal stakes. The outer peripheral edge can then be trimmed as necessary to conform the fabric to the precise configuration of the area to be landscaped.

Slits are then cut in the landscape fabric to a sufficient size to permit young trees, bushes, perennials and the like to be planted. After the planting has been completed, the entire area may be covered with several inches of mulch such as bark chips or shredded hardwood, decorative rock or gravel if a permanent landscape project. For crop use, such as strawberries or tomatoes, mulch is not used.

As moisture enters the landscaped area, as by rain or sprinkling, the water passes through the mulch, rock or gravel and reaches the top side of the landscape fabric. It reaches the channels 17, 18 and is directed into the apertures 16 and then into the soil beneath the landscape fabric. In this manner, all of the plant life within the landscaped area receives the moisture that has been supplied.

However, as shown in FIGS. 1–3 and 5, even to the extent sunlight is transmitted through the mulch, gravel or rock, it cannot pass through the landscape fabric 11 which is imperforate other than the apertures 16. Stated otherwise, the fact that the apertures 16 are disposed in upstanding sidewalls 14a, 14b prevents sunlight from entering because its angle of incidence is not sufficiently low. Since sunlight cannot be transmitted below the landscape fabric 11, seeds of weeds and other undesirable plants cannot easily propagate, and if germination does occur life cannot continue in the absence of light.

The above specification, examples and data provide a complete description of the manufacture and use of the composition of the invention. Since many embodiments of the invention can be made without departing from the spirit and scope of the invention, the invention resides in the claims hereinafter appended.

We claim:

1. Improved landscape fabric comprising:
   a sheet of thermoplastic material of predetermined length, width and thickness constructed to lie over an area to be landscaped;
   the sheet of material being formed with a plurality of ridges each having at least one upright wall;
   a plurality of valleys respectively disposed adjacent said plurality of ridges; and
   a plurality of apertures formed through the upright walls of said plurality of ridges, the apertures being disposed to permit the flow of water and air therethrough to the underside of the sheet while inhibiting the passage of light therethrough.

2. The landscape fabric defined by claim 1, wherein each of said ridges comprises a pair of upright walls and an interconnecting top.

3. The landscape fabric defined by claim 2, wherein apertures are formed in each of said upright walls.

4. The landscape fabric defined by claim 3, wherein said ridges and valleys are disposed in substantially aligned relation, and said valleys are defined by the area between adjacent ridges.

5. The landscape fabric defined by claim 4, wherein said ridges and valleys are disposed in parallel relation.

6. The landscape fabric defined by claim 5, wherein said ridges are substantially equidistantly spaced.

7. The landscape fabric defined by claim 6, wherein the ridges and valleys are uniformly disposed over substantially the entirety of said sheet.

8. The landscape fabric defined by claim 7, wherein said apertures are disposed at substantially the juncture of each of said upright walls and the adjacent valley.

9. The landscape fabric defined by claim 8, wherein said apertures are formed over substantially the entire length of each of said upright walls.

10. The landscape fabric defined by claim 9, wherein said apertures are uniformly spaced over the length of each of said upright walls.

11. The landscape fabric defined by claim 4, which further comprises a plurality of transverse channels disposed in each of said valleys with the apertures disposed in opposed sidewalls of adjacent ridges.

12. The landscape fabric defined by claim 11, wherein the apertures and channels are disposed in transverse aligned rows.

13. The landscape fabric defined by claim 1, wherein the sheet is imperforate except for said apertures.

14. The landscape fabric defined by claim 1, wherein the thermoplastic sheet is formed from recycled plastic material.

* * * * *